United States Patent
Lee et al.

(10) Patent No.: US 9,153,064 B2
(45) Date of Patent: Oct. 6, 2015

(54) GROUPING PIXELS TO BE TEXTURED

(75) Inventors: Victor W. Lee, Santa Clara, CA (US);
Ganesh S. Dasika, Ann Arbor, MI (US);
Mikhail Smelyanskiy, San Francisco, CA (US); Jose Gonzalez, Barcelona (ES); Changkyu Kim, San Jose, CA (US); Jatin Chhugani, Santa Clara, CA (US); Yen-Kuang Chen, Cupertino, CA (US); Julio Gago, Barcelona (ES); Santiago Galan, Barcelona (ES); Victor Moya Del Barrio, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 12/646,411

(22) Filed: Dec. 23, 2009

(65) Prior Publication Data
US 2011/0148896 A1 Jun. 23, 2011

(51) Int. Cl.
*G06T 15/00* (2011.01)
*G06T 15/04* (2011.01)
*G06T 11/00* (2006.01)
*G06T 7/60* (2006.01)

(52) U.S. Cl.
CPC .............. *G06T 15/04* (2013.01); *G06T 11/001* (2013.01); *G06T 15/005* (2013.01); *G06T 7/60* (2013.01)

(58) Field of Classification Search
USPC ......................................................... 345/582
See application file for complete search history.

(56) References Cited

U.S. PATENT DOCUMENTS

| | | | |
|---|---|---|---|
| 5,889,526 A * | 3/1999 | Hashimoto .................... | 345/582 |
| 2001/0055032 A1 | 12/2001 | Saito et al. | |
| 2003/0227462 A1 | 12/2003 | Akenine-Moller et al. | |
| 2004/0022444 A1* | 2/2004 | Rhoads ......................... | 382/232 |
| 2007/0035707 A1* | 2/2007 | Margulis ....................... | 353/122 |
| 2008/0016145 A1* | 1/2008 | Takase et al. ................. | 709/203 |
| 2008/0238919 A1* | 10/2008 | Pack .............................. | 345/420 |
| 2009/0074302 A1 | 3/2009 | Kishi | |
| 2010/0257507 A1* | 10/2010 | Warren ......................... | 717/106 |

FOREIGN PATENT DOCUMENTS

EP 1128328 11/2003

OTHER PUBLICATIONS

British Patent Office, Combined Search and Examination Report issued in corresponding GB Application No. GB1020913.8, dated Apr. 11, 2011, 7 pgs.

* cited by examiner

*Primary Examiner* — Xiao Wu
*Assistant Examiner* — Matthew D Salvucci
(74) *Attorney, Agent, or Firm* — Trop, Pruner & Hu, P.C.

(57) ABSTRACT

A region or group of pixels may be textured as a unit, using a range specifier and one or more anchor pixels to define the group. In some embodiments, processing grouped pixels improves efficiency.

19 Claims, 2 Drawing Sheets

GROUPING PIXELS TO BE TEXTURED

BACKGROUND

This relates generally to graphics processing and, particularly, to the texture unit of a graphics processor.

A graphics processor is a dedicated processor that generally handles processing tasks associated with the display of images. A graphics processor may include a number of specialized function units, including a texture unit. A texture unit performs texture operations including texture decompression and anisotropic filtering.

A texture sampler is a special type of texture unit that optimizes texture filtering and performs texture filtering faster than a general purpose processor.

DETAILED DESCRIPTION

In accordance with some embodiments, a texture unit, such as a texture sampler, may be utilized to perform mathematical calculations. The efficiency of communication between a processor core and a texture unit may be improved, in some embodiments, by reducing the computational overhead born by the core in encoding groups of pixels to be textured. In some embodiments, this may be accomplished by a range specifier that effectively groups a block of pixels as a range specified by one pixel belonging to the group. Thus, in some embodiments, a texture user interface benefits both graphics and non-graphics usages of the texture unit.

Figure 1:
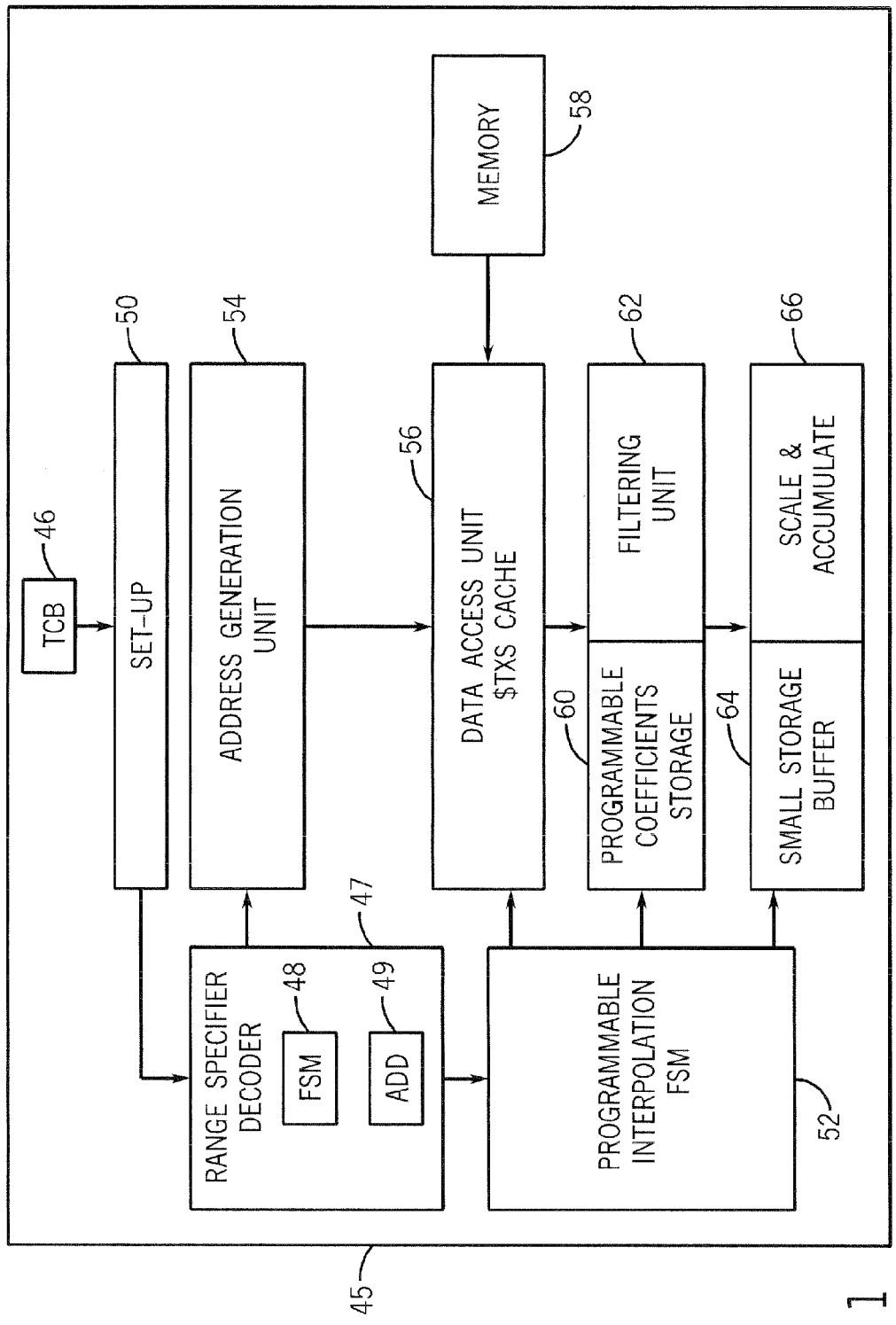
FIG. 1 is a schematic depiction of a texture unit according to one embodiment.

Referring to FIG. 1, a texture unit core 45 of a texture unit receives a texture request via a texture control block (TCB) 46. The texture control block 46 may include a pointer to texture surfaces, the width and height of the texture surfaces, the texture coordinates (u, v) for n pixels to be textured, the type of filtering operation to be performed, such as linear, bi-linear, or tri-linear, whether a general convolution or n×m dot product operation is implicated, and the texture filter results.

An address generation logic in the address generation unit or stage 54 computes addresses of all the texels used by a given filtering operation. The coordinates u and v of the pertinent pixel are passed in either unnormalized form, or normalized form between 0.0 and 1.0. In the latter case, they are unnormalized by multiplying them by a surface dimension. For example, u becomes i·bu, where i is an integer and bu is a fraction. The integer portion is used to produce nearest neighbors. In the case of bi-linear interpolation, there are four neighbors: (i,j), (i+1,j), (i,j+1), and (i+1,j+1). In tri-linear filtering operations there are eight neighbors. The fractional part may be used to calculate the weights which may be used when blending the neighboring pixels.

A texture cache 56 may be coupled to the address generation stage 54, and is used to cache data from memory 58 which is accessed using the generated texel addresses. An interpolation stage 62 may be coupled to the texture cache 56. An accumulation stage 66 with accumulation logic and a small storage buffer 64 is coupled to the interpolation stage 62 in one embodiment.

The texture control block 46 is used as an input to the range specifier decoder 47 through a set-up stage 50. The decoder 47 may include a finite state machine (FSM) 48 in the texture unit to compute the (u,v) coordinates from a range specifier. An adder 49 may also be provided in the decoder and, in some embodiments, multiple adders may be utilized.

Instead of specifying individual u and v coordinates for each pixel to be textured, a range specifier may be used in some embodiments. The range specifier may be defined for common geometric shapes, such as squares, rectangles, triangles, and the like. For example, the structure, such as the following structure, can be used to specify a rectangular region:

```
struct {
    int u;
    int v;
    int dU;
    int dV;
} rectangle_specifier;
```

Figure 2:
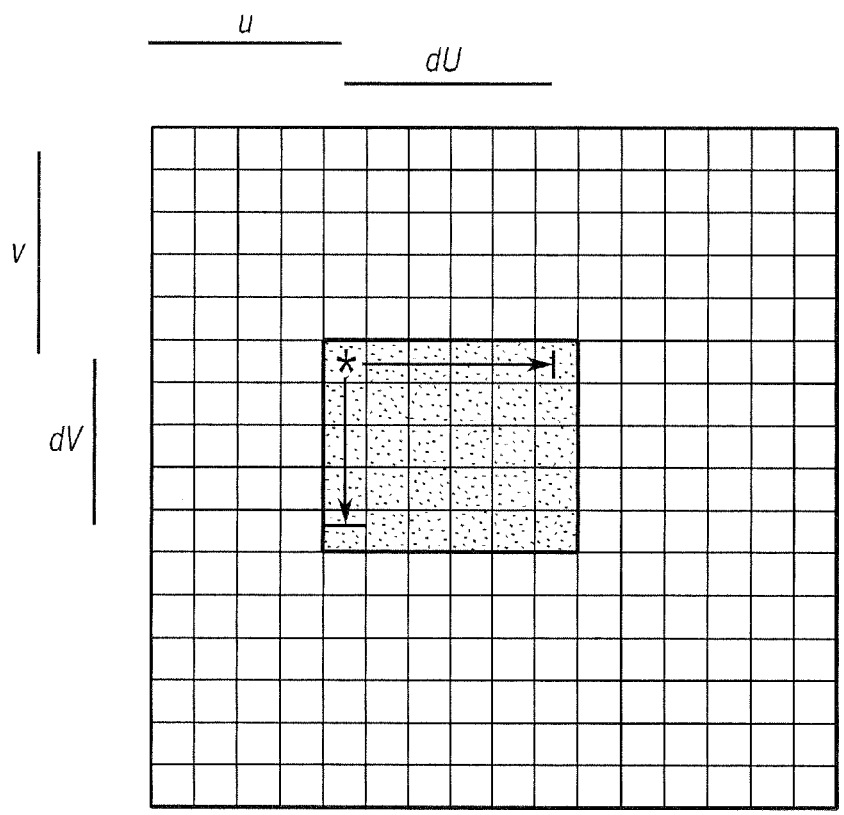
FIG. 2 is a depiction of a pixel coordinate system for one embodiment.

Such a rectangular region is shown in FIG. 2. It shows a scheme for range based addressing where the initial u and v values and the offsets dU and dV in the x and y directions are specified, but they provide a rectangular window of array elements for consideration. Particularly, in the example shown in FIG. 2, a 6×5 rectangular region is depicted in shading within a grid. The upper left corner, marked by an asterisk, is at the u,v coordinate (6,5). The rectangular region may be specified by a tuple of {5, 6, 6, 5} where the first two positions (5, 6) are the u and v coordinates and the second two positions (6, 5) are the dU and dV offsets in the u and v directions, respectively.

Instead of computing a (u,v) pair for each of the pixels in the shaded block, only the (u,v) pair for the upper left corner pixel, marked by an asterisk, may be necessary in this example. This may save thirty times (u,v) computations, in this example.

In addition, rather than specifying all pairs of u and v coordinates within the shaded rectangle, which takes 30×2× 4B or 240B pairs, only a tuple of four B values may be used (4×4B=16B), saving 224B in some embodiments. The reduced storage can then be used to encode returned data. The use of the tuple may conserve bandwidth in communicating u,v pairs to the texture sampler in some embodiments.

Thus, a geometric shape (such as the rectangle shown in FIG. 2) may be defined using one or more anchor pixels (with one anchor pixel indicated by an asterisk in FIG. 2). The anchor pixel is a pixel in a defined position within the known geometric shape. Based on the location of the anchor pixel and the tuple, the group of pixels defined by the known shape may be specified as a group. As another example, the anchor pixel of a circular group of pixels may be the center of the circle, for example.

In some embodiments, the type of geometric shape may also be encoded within the tuple. This approach allows dynamic selection of the most appropriate geometric shape in different circumstances.

A sequencer finite state machine (FSM) 52 that generates the texture coordinates may be implemented in hardware, as range decoding logic, or as software. It computes the texture coordinates from the range specifier. The decoding logic within the decoder 50 may be an extra stage in the address generation stage 44 in some embodiments.

Coordinate unnormalization takes normalized u and v coordinates, which are between 0.0 and 1.0 and multiplies them by the image dimensions DIMX and DIMY, respectively. Then the u coordinate becomes uint·ufract, where uint is an integer and ufract is a fraction. The v coordinate becomes vint·vfract, with the same nomenclature.

The hardware decoding range logic in the range specifier decoder 47 accepts, as an input, the uint and vint values and generates all addresses in the specified range automatically.

The complexity of the coordinate generation logic depends on the types of shapes supported. For a simple rectangular specifier, a simple finite state machine with a single adder 49 may be sufficient in some embodiments. The adder 49 is used to generate addresses in each dimension.

The finite state machine 52 generates all addresses in the specified range of addresses. Those addresses are forwarded to the rest of the texture unit pipeline.

The following pseudo code shows an example of how FSM 52 generates all addresses in the specified range of addresses in some embodiments:

```
Inputs:
integer base uint (floor(u*DIMX)), integer base vint
(floor(v*DIMY)),
u range (dU), v range (dV),
FSM:
pair=(uint, vint)
for (i=0; i<dU; i++)
    for (j=0; j<dV; j++)
        pair += (1,1)
```

The range specifier FSM 48 together with an adder 49 may execute the sequence of FSM instructions set out above to produce a sequence of individual (u,v) coordinates for each texel in the range, which are passed through the rest of the texture pipeline to initiate and perform a corresponding filtering operation. The sequencer FSM 52 enables the texture sampler to handle any general m×n-element dot product.

A programmable coefficients storage 60 may store the coefficients that are needed by the linear interpolators. The sequencer FSM 52 may break up the m×n dot product into a combination of 2-, 4- or 8-element dot product operations, which can be performed using linear, bilinear or trilinear interpolators of the filtering unit). It then cycles through the dot product operations and accumulates for the final output, using accumulator 66.

In some embodiments, in addition to improving the efficiency of the core texture unit communication, improvements in performance of general purpose computing using texture unit hardware may be achieved. For example, when performing texture sampler based convolution, the range based specifier can save a significant amount of computation needed to specify the (u,v) pair for each pixel. For a texture control block of 64 pixels, using the range specifier would involve 192 instructions to create the texture control block. Using the range based specifier, only 66 instructions may be used, in some embodiments, saving 126 instructions. The smaller texture unit setup overhead may translate to more computation for graphics algorithms or non-graphics applications in some cases.

Elements shown in FIG. 1 may be implemented in software, hardware, or firmware in some cases. In a software embodiment, the range specifier decoder 47 may be implemented by a sequence of instructions stored in a computer readable medium such as a texture control block 46. However, any optical, magnetic, or semiconductor memory may be used. Then the instructions may be executed by a suitable processor, such as a texture control block 46, as one example.

Figure 3:
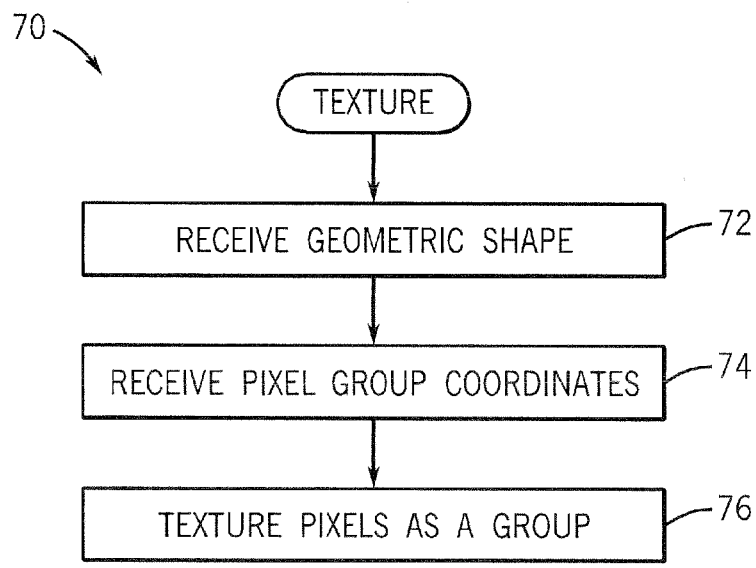
FIG. 3 is a flow chart for one embodiment.

Referring to FIG. 3, the texture control block 46 may execute a sequence of instructions 70, in one embodiment, to implement the decoder 47 in software. In some embodiments, the geometric shape, such as "rectangle," may be received, as indicated in block 72. The coordinates of an anchor pixel for a group of pixels may be received, as indicated in block 74. The coordinates and shape may, for example, be part of a tuple. Then, the group of pixels may be textured as a group, as indicated by block 76.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor. While linear interpolation is described herein, other forms of interpolation can also be used.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    assigning a different range specifier to each of a plurality of known geometric shapes having at least three sides, each specifier associated with at least one anchor pixel in a defined position with the geometric shape, each range specifier including a unique code to identify a known geometric shape regardless of its location, scale or orientation;
    selecting one of the plurality of known geometric shapes using a range specifier;
    forming a tuple including coordinates of the one or more anchor pixels of the selected geometric shape, together with information about the shape derived based on the range and offsets in two dimensions, specified in the range specifier of the selected geometric shape, to specify a group of pixels to be textured, using less coordinates than needed absent the use of the range specifier and wherein said group includes more pixels than said one or more anchor pixels such that use of the range specifier avoids transferring coordinates for all pixels in the group;
    using the tuple to encode said geometric shape to be recognized by decoding logic;
    generating pixel addresses within a range specified by said tuple using decoding logic;
    transferring said tuple to a texture shader that generates all of the pixels of the group from the tuple; and
    accumulating the pixel addresses in each dimension within the range.

2. The method of claim 1 including using a rectangle as said geometric shape.

3. The method of claim 1 including using a finite state machine and an adder to generate said addresses.

4. The method of claim 1 including texturing as a unit a region of pixels making up said geometric shape.

5. The method of claim 1 including determining a dot product over the range.

6. The method of claim 1 including determining a programmable convolution over the range.

7. A non-transitory computer readable medium storing instructions executed by a computer to:
    select one of the plurality of known geometric shapes using a specifier to identify a known geometric shape regardless of its location, scale or orientation;
    form a tuple including coordinates of the one or more anchor pixels of the selected geometric shape, together with information about the shape derived based on the range and offsets in two dimensions, specified in the range specifier of the selected geometric shape, to specify a group of pixels to be textured, use less coordinates that needed absent the use of the range specifier and wherein said group includes more pixels than said one or more anchor pixels such that the use of the range specifier avoids transferring coordinates for all pixels in the group;
    encode said geometric shape using the tuple recognized by decoding logic;
    generate pixel addresses within a range specified by said tuple using decoding logic;
    transfer said tuple to a texture shader that generates all of the pixels of the group from the tuple; and
    accumulate the pixel addresses in each dimension within the range.

8. The medium of claim 7 further storing instructions to use a rectangle as the geometric shape.

9. The medium of claim 7 further storing instructions to use a finite state machine and an adder to generate said addresses.

10. The medium of claim 7 further storing instructions to texture as a unit a region of pixels making up said geometric shape.

11. The medium of claim 7 further storing instructions to determine a programmable convolution over the range.

12. The medium of claim 7 including determining a dot product over the range.

13. An apparatus comprising:
    a processing entity;
    a memory coupled to said processing entity;
    an address generation logic to use coordinates of the one or more anchor pixels of a selected geometric shape, together with information about the shape derived based on the range and offsets in two dimensions, said information including a unique code to identify a known geometric shape regardless of its location, scale or orientation, specified in the range specifier of a selected geometric shape, to specify a group of pixels to be textured, using less coordinates than needed absent the use of the range specifier and wherein said group includes more pixels than said one or more anchor pixels such that use of the range specifier avoids transferring coordinates for all pixels in the group, and to transfer the coordinates of one or more anchor pixels and said information to a texture shader that generates all of the pixels of the group;
    a range specifier decoder coupled to said address generation logic, a finite state machine in said decoder; and
    an adder in said decoder.

14. The apparatus of claim 13 further including a texture cache coupled to said address generation logic and an interpolation unit coupled to said texture cache.

15. The apparatus of claim 14 including an accumulation logic coupled to said interpolation logic.

16. The apparatus of claim 13, said decoder to decode said geometric shape using a tuple.

17. The apparatus of claim 16, said decoder to generate pixel addresses within a range specified by said tuple.

18. The apparatus of claim 13, said decoder including a finite state machine and an adder to generate said addresses.

19. The apparatus of claim 13 to texture as a unit a region of pixels making up said geometric shape.

* * * * *